Figure 1:
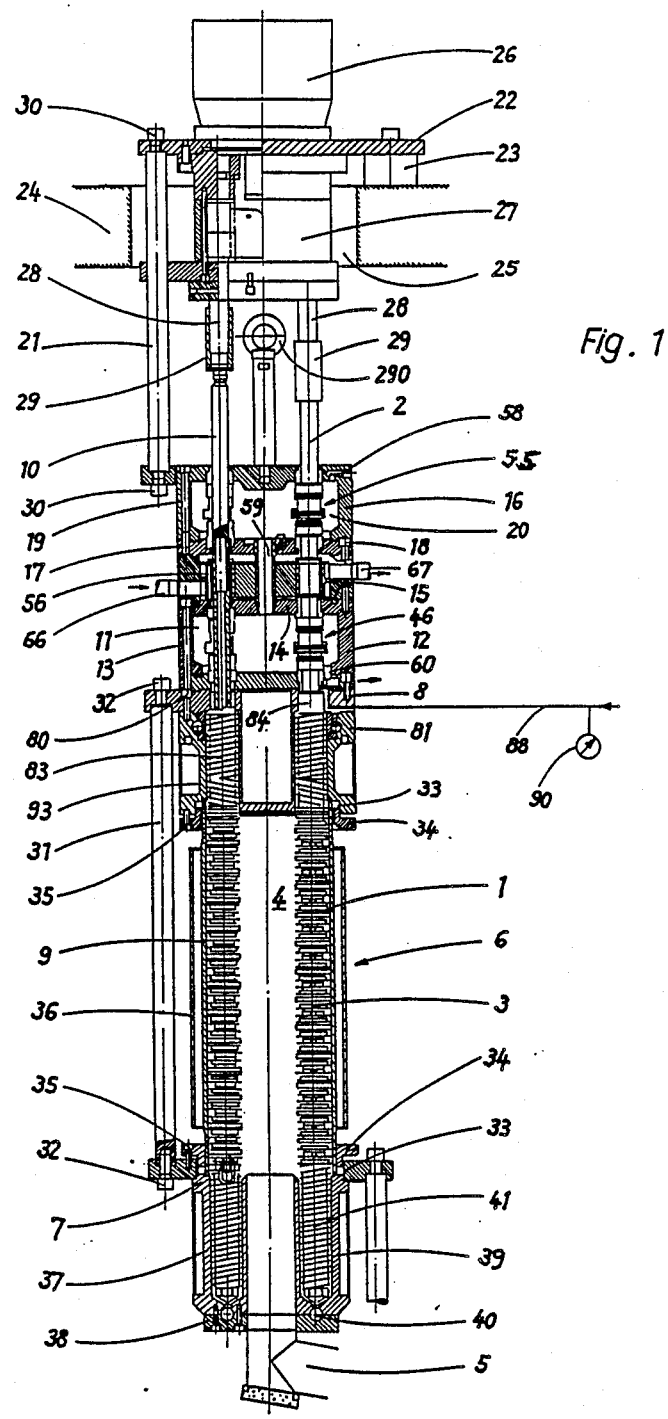

United States Patent [19]

Fritsch

[11] Patent Number: 4,773,654

[45] Date of Patent: Sep. 27, 1988

[54] SHAFT SEAL ASSEMBLY, IN PARTICULAR FOR AN APPARATUS FOR CONTINUOUS PROCESSING OF VERY VISCOUS MEDIA

[76] Inventor: Rudolf P. Fritsch, Goslarerstrasse 58, 7000 Stuttgart 31, Fed. Rep. of Germany

[21] Appl. No.: 27,225

[22] PCT Filed: Jun. 4, 1986

[86] PCT No.: PCT/DE86/00231

§ 371 Date: Jan. 27, 1987

§ 102(e) Date: Jan. 27, 1987

[87] PCT Pub. No.: WO86/07303

PCT Pub. Date: Dec. 18, 1986

[30] Foreign Application Priority Data

Jun. 8, 1985 [DE] Fed. Rep. of Germany ....... 3520662

[51] Int. Cl.[4] .................. F16J 15/36; F16J 15/40; B01J 19/20; B29B 7/48
[52] U.S. Cl. .......................... 277/3; 277/12; 277/15; 277/22; 277/88; 366/84
[58] Field of Search ................ 277/3, 12, 15, 17, 27, 277/32, 88-90, 22; 366/79, 83, 84, 91

[56] References Cited

U.S. PATENT DOCUMENTS

| 2,694,256 | 11/1954 | Coon et al. ................ 366/84 X |
| 2,949,321 | 8/1960 | Tracy ........................ 277/88 X |
| 3,154,808 | 11/1964 | Ahlefeld, Jr. et al. . |
| 3,199,145 | 2/1965 | Tiemersma . |
| 3,407,439 | 10/1968 | Gregory ...................... 366/84 |
| 3,829,067 | 8/1974 | Matsuoka ................... 366/84 X |
| 3,848,879 | 11/1974 | Hudgins . |
| 4,355,905 | 10/1982 | St. Louis et al. ........... 277/12 X |
| 4,500,093 | 2/1985 | Kapich . |

FOREIGN PATENT DOCUMENTS

| 1111154 | 2/1962 | Fed. Rep. of Germany . |
| 1246223 | 8/1967 | Fed. Rep. of Germany . |
| 59-58270 | 4/1984 | Japan ......................... 277/3 |
| 360492 | 1/1973 | U.S.S.R. . |
| 596774 | 3/1978 | U.S.S.R. . |
| 998799 | 2/1983 | U.S.S.R. . |
| 766206 | 2/1986 | U.S.S.R. . |
| 1088037 | 10/1967 | United Kingdom . |

OTHER PUBLICATIONS

Meyer, "End Face Seal", Maschinostroenie, 1978, p. 228.
Slide Seal for Chemical Reaction Stirring Vessels by Dipl. Ing. H. Schnarkowski-Chemie-Ing. Techn. vol. 36, 1964, pp. 1134-1136.

Primary Examiner—Robert S. Ward
Attorney, Agent, or Firm—Frishauf, Holtz, Goodman & Woodward

[57] ABSTRACT

A shaft seal assembly for an apparatus for continuous processing of very viscous media, in particular for producing high molecular weight polymers, having parallel shafts (1) carrying at least two cooperating processing tools (3), with which shafts feed and removal devices for the product to be processed and one reaction chamber (4), which can be subjected to a vacuum, has sealing means having at least one slide ring seal (46, 55), by which means the reaction chamber is sealed off, in the vicinity of the shaft ducting devices, from a confining-liquid chamber (11) located on the outside and surrounding the shaft ends, which chamber contains confining liquid. To avoid the entry of confining liquid into the reaction chamber and to improve the sealing action, the arrangement is selected such that on the side oriented toward the reaction chamber, adjoining the sealing means, each shaft (1) is surrounded by an inert gas cushion, which has a higher pressure than the confining liquid and is defined, sealed off from the reaction chamber (4), by means of housing parts (81) surrounding the shafts over a portion of their length as well as by means of the product to be processed, which surrounds the shafts and is under pressure.

22 Claims, 11 Drawing Sheets

SHAFT SEAL ASSEMBLY, IN PARTICULAR FOR AN APPARATUS FOR CONTINUOUS PROCESSING OF VERY VISCOUS MEDIA

The invention relates to a shaft seal assembly, in particular for an apparatus for continuous processing of very viscous media, in particular for producing high molecular weight polymers, for example for the condensation of polyester, having at least two parallel shafts, each carrying processing tools, and with which shafts feed and removal devices for the product being processed and one reaction chamber that can be subjected to a vacuum are associated, the vacuum chamber being defined on at least one side by a housing portion which has ducting devices for the shafts that can be coupled with a distributor gear driving them and located on the outside, wherein the reaction chamber, in the vicinity of the shaft ducting devices, is sealed off via sealing means including at least one slide ring seal from an external sealing- or confining-liquid chamber surrounding the shaft ends and containing a confining or sealing liquid.

In apparatuses of this kind, also known as reactors, but also as in multiple-shaft mixers or kneaders for plastics production, in which for degassing purposes a reaction chamber subjected to a vacuum is provided, the problem of sealing between the reactor interior and the atmosphere in the vicinity of the shaft ducts arises. Sealing is difficult because in many of these reaction operations a vacuum is used, and in the condensation of polyester a pronounced vacuum, to the extent of 0.1 Torr, is used.

In the shaft ducts of such apparatus, it is known to use special slide ring seals and to provide containing-liquid chambers, which are filled with a suitable confining liquid, such as cooled thermal oil, and are subjected to a vacuum. For reasons having to do with service life, slide ring seals having sliding surfaces of silicon carbide are used.

Because slide ring seals have to be able to "breathe" somewhat, for functional reasons, because of the axially resiliently loaded sealing ring, it is unavoidable in practice that confining fluid will be aspirated into the reaction chamber. In many cases, however, this is undesirable or impermissible.

It is therefore the object of the invention to devise a shaft seal assembly for such reactors or for apparatuses subjected to comparable conditions, which assures satisfactory sealing of a housing interior, in this case in particular, a reaction chamber subjected to a vacuum, with respect to the atmosphere, with a long service life and easy maintenance, while at the same time the entry of confining liquid or other undesirable contaminants into the sealed housing interior is reliably precluded.

For attaining this object, the shaft seal assembly as described above is characterized in accordance with the invention in that on the side oriented toward the reaction chamber, adjoining the sealing means, each shaft is surrounded by a cushion of inert gas, which has a higher pressure than the confining fluid, and is defined such that it is sealed off from the reaction chamber by housing portions surrounding the shafts over a portion of their length as well as by the product being processed which surrounds the shafts and is under pressure.

Because of its higher pressure, the cushion of inert gas prevents the entry of confining liquid via the sealing means and via optionally provided shaft radial bearings into the sealed-off chamber.

Because the inert gas cushion is itself sealed off, along the shafts toward the sealed-off chamber—with the exception of the housing portions intermittently surrounding the shafts—by means of the product being processed, which is under pressure, on this side of the inert gas cushion its own sealing devices, subjected to wear and for example such as slide ring seals or the like, are not required. At the same time, the inert gas cushion prevents the vacuum from the reaction chamber from reaching the sealing means and becoming operative there. Small quantities of inert gas entrained into the reaction chamber during operation are harmless; they are aspirated out by the vacuum pumps and the like subjecting the reaction chamber to the vacuum.

The inert gas cushion is suitably located in each case adjoining a slide ring seal of the sealing means.

In order to prevent premature wear of the slide ring seal due to dry friction conditions, the arrangement may be selected such that the inert gas cushion acts upon on a liquid, or fluid, surface located above the surfaces of the slide ring seal, the liquid being a confining liquid supplying the slide ring seal. Because of the difference in pressure, a film of lubricant fluid is effective between the slide ring seal surfaces, providing mixed friction and thereby assuring an unlimited service life of the slide ring seal, especially since solid matter in the vicinity of the slide ring seal cannot form if a suitable lubricant fluid is used. An inert lubricant having a long-term temperature resistance of 280° C. has proved to be a suitable lubricant fluid of this kind.

It is advantageous for the shaft seal assembly to have a circulating loop containing liquid containing liquid pumping means for the lubricant fluid, the loop communicating with the inert gas cushion and optionally with a source of inert gas and being guided via a device for adjusting the level of lubricant fluid with respect to the slide ring seal surfaces. Additionally, the circulating loop can communicate with devices for monitoring the occurrence of a loss of lubricant fluid and for replacing missing lubricant fluid.

The lubrication of slide ring seals of the shaft seal assembly, which are located more remotely from the reaction chamber, can also be assured in a relatively simple manner. The shaft ends on the drive side can be surrounded by lubricant fluid, the fluid level of which is above the slide ring seal surfaces of a slide ring seal located in this vicinity.

For heavy duty, it is advantageous if at least some of the sealing elements of the slide ring seals are at least partly surrounded by a thermal fluid. Optionally, the slide ring seal surfaces of the corresponding slide ring seals can then be lubricated directly with this thermal fluid.

A small quantity of the lubricant fluid can enter into the confining-liquid chambers via the slide ring seal surfaces and mix with the confining liquid; this is harmless. It is now possible to monitor the resultant increase in volume of the confining liquid; if the increase in volume exceeds a predetermined amount per unit of time, then this is an indication of impermissible or excessive seal wear.

In this manner, satisfactory monitoring of the sealing is assured without having to undergo particular expenditure to this end or having to accept the unexpected interruptions in operation that would arise if monitoring were lacking.

As a rule, nitrogen can be used as the inert gas; however, depending on the particular product to be processed, some other suitable gaseous medium can also be used.

In order to attain the required pressure on the part of the product to be processed, for sealing of the inert gas cushion, in the region adjoining the inert gas cushion, the arrangement is preferably such that the shafts, preferably in the vicinity of their exit from the housing portions surrounding them and communicating with the feed devices for the product to be processed, have throttling or reversing elements, which act counter to the product to be processed that is supplied in the longitudinal direction of the shafts, and by means of which elements the product to be processed can be placed under a predetermined backpressure in the vicinity adjoining the inert gas cushion. Simple structural conditions are attained if the reversing elements are formed as feed screws at least partly surrounded by the housing portions, the courses of the screws being located such that they run in the opposite direction to the courses of feed screws located coaxially with and preceding them in the housing portions; the feed pressure generated by the feed screws is higher than the backpressure generated by the reversing elements. The feed elements thus "push" the product to be processed through the screw courses of the reversing screws following them and acting in the opposite direction. By suitable dimensioning, in particular of the axial length, but also of the pitch and form of the screw courses of the feed and reversing screws, any desired pressure can be generated automatically, in the supplied product that is to be processed, by simple means in the "sealing region" adjoining the inert gas cushion.

Furthermore, the inert gas cushion can be formed, adjoining the sealing means, in a chamber surrounding each of the shafts, which communicates with a source of inert gas and is defined on one side by an annular gap with respect to the product to be processed. The annular gap forms a throttle restriction and prevents the unintended entry of the product to be processed into the chamber directly adjoining the sealing means.

In the case of shafts located in a ring and with their processing elements meshing with one another—such as is known, for instance, from German Patent DE-OS No. 30 30 541—the shafts can have preferably circular round disks in the vicinity of their exit from the housing portions surrounding them, the disks meshing with one another forming defined gaps, and being stacked axially spaced apart from one another and acting as throttle elements, by means of which the supplied product to be processed can be spread into thin films. In such apparatuses, the product to be processed is introduced into the reaction chamber, which is subjected to a vacuum and annularly surrounded by the shafts located in a ring, in the form of thin films, as a result of which it undergoes particularly effective processing and degassing. The intermeshing disks located at the outlet of the shafts from the housing portions surrounding them on the feed side prevent the product that is to be processed from reaching the reaction chamber in the form of a thick film. At the same time, the thin films of the product to be processed that fill the gaps between the intermeshing disks result in satisfactory sealing of the inert gas cushion and, acting as throttle restrictions, generate a reverse pressure. For the above reason, it is also suitable for the disks in each stack, on their inside oriented toward the reaction chamber, to be surrounded by housing portions only over part of the axial stack length, while on their outside, they can be surrounded with play by housing parts over the entire axial stack length.

In order to be able to adapt the pressure (backpressure) originating in the throttling or reversing elements in terms of the processing pressure adjoining the inert gas cushion and sealing off the inert gas cushion from the reaction chamber to the viscosity of the particular product being processed, yet without having to remove and replace the throttling or reversing elements, it is advantageous for the housing portions surrounding the throttling or reversing elements to be axially adjustable with respect to the throttling or reversing elements by varying the backpressure generated. This adjustment can be accomplished within predetermined threshold values, and in particular continuously, and makes retrofitting work completely unnecessary. By means of the axial adjustment, the throttling or reversing elements are laid partially bare over a greater or smaller portion of their axial length on their outer circumferential surface, as a result of which the reversing or throttling action originating with them is varied accordingly. When the shaft seal is required to perform heavy duty, for example in apparatuses the reaction chamber of which is subjected to a pronounced vacuum, the sealing means can have two slide ring seals located one after the other in the axial direction, each of which has a confining-liquid chamber associated with it and containing a confining, or sealing liquid.

The confining liquid can at the same time serve to cool the slide ring seals. In order to assure that all the slide ring seal parts are flushed simultaneously and uniformly from all sides with confining liquid, and that proper heat dissipation is provided, the arrangement can advantageously be such that each confining-liquid chamber contains a feed device for confining liquid that discharges into its lower portion, and a removal device for confining liquid, exiting from its upper portion, and that the feed and removal devices for the confining liquid are located in a confining-fluid circulating loop containing a regulated cooling device, by means of which loop the confining fluid can be recirculated.

Between the two slide ring seals, a radial bearing may additionally be provided for each shaft end, the radial bearing on the one hand assuring a certain "blockage" associated with leakage between the inlet and outlet for the confining liquid via the two confining-liquid chambers located one after the other in the flow direction, wherein the small quantity of confining liquid penetrating through the radial bearing simultaneously serves as a bearing lubricant; on the other hand, the radial bearing effects a radial guidance of the shafts, so that the slide ring seals located on both sides of this radial bearing are suitably well guided in the radial direction. Finally, the radial bearing assures that the shafts cannot buckle in the operating state and that the slide ring seals will remain in their respective operating locations if the entire actual reaction body, along with the shafts and the shaft ducting devices, is extracted from the distributor gear and removed from the associated housing for cleaning purposes.

The radial bearings and/or at least some of the sealing elements of the slide ring seals can be surrounded at least partly by a flow of thermal fluid flowing through the hollow shafts, the thermal fluid contributing to the cooling of these parts, and these sealing elements optionally being lubricated with this thermal fluid in the vicinity of the slide ring seal surfaces.

If thermal oils are used as the confining fluid, it is unavoidable that the slide ring seals sealing off the confining-liquid chamber from the atmosphere, because of their "breathing" properties, will emit noisome substances to the atmosphere, which is undesirable. Also, on the one hand, the aspiration of outside air into the confining-liquid chamber, which is under a vacuum, should be avoided. while on the other hand, as already noted. these slide ring seals effecting the sealing off with respect to the atmosphere require reliable lubrication if they are to be suitable for heavy duty. In order to assure this, the shaft ends on the drive side can as already explained be surrounded by (inert) lubricant fluid, the fluid level of which is located above the slide ring seal surfaces of the corresponding slide ring seal, and thus acts as an additional barrier with respect to the outside, that is, the atmosphere. The chamber containing this lubricant fluid can also be connected to the lubricant-fluid circulating loop for a slide ring seal located nearer to or directly adjoining the inert gas cushion, and the level of lubricant fluid for this slide ring seal can likewise be kept at a predetermined level above the slide ring seal surfaces by a suitable device.

Finally, each of the slide ring seals can be formed as a double seal, having two sealing elements integral with the housing and located axially spaced apart from one another and two sealing rings resiliently pressed against these sealing elements in the axial direction, the sealing rings of which are axially resiliantly braced against one another.

The sealing rings of the slide ring seals cooperating with the sealing elements integral with the housing were formerly fixed in a torsion-proof manner on the shaft by means of radial grub screws. If the electrical current fails, for instance, and the shafts, which rest relatively closely against one another, remain stopped at an unfavorable rotational position, then in the course of the disassembly work that is then necessary in order to clean the reactor of solidified material being processed, the radial grub screws may be covered by the particular neighboring shaft and as a result may be inaccessible. Also, this manner of anchoring the sealing rings on the shaft does not enable generating the required high pressing forces in the vicinity of the sealing surfaces. These disadvantages can be overcome by providing that the two sealing rings are each axially braced via two thrust bushings which are joined to one another by means of flanges and axially accessible clamping screws, the flanges of adjoining shafts being formed and located such that they roll off on one another with play.

Most plastics are first granulated and stored for some time after being produced, because they are not yet suitable for the final processing intended for a given use. Plastics especially intended for injection molded articles or films are then remelted, beginning with the granulated material, and provided with additives. Additives of this kind include stabilizers, plasticizers, anti-oxidant agents, fillers, pigments, fibers, flame-retardants, and so forth. The addition of the additives was formerly done in compounding machines especially developed for this purpose, where the plastic is again converted to granulated form, and from that state it is then remelted in an injection molding machine and shaped into the final consumer article. Not only does this repeated melting of the plastic mean a considerable additional expenditure of energy, but the properties of the plastic also suffer in the course of these melting operations.

The novel shaft seal now enables a substantial simplification by providing that discharging into the region adjoining the inert gas cushion, following the feed device for the product to be processed, is a feed device for additives, which has a gastight supply container containing the additives, the interior of which is subject to the pressure of the inert gas cushion and communicates with this cushion. Since the inert gas cushion has a higher pressure than the atmosphere, oxygen from the air is precluded from being fed into the reaction chamber or into the melt when the additives are added, yet additional provisions to assure this are unnecessary. The inert gas cushion of the shaft seal can thus simultaneously be exploited for enabling addition of the additives without oxygen from the air.

Figure 2:
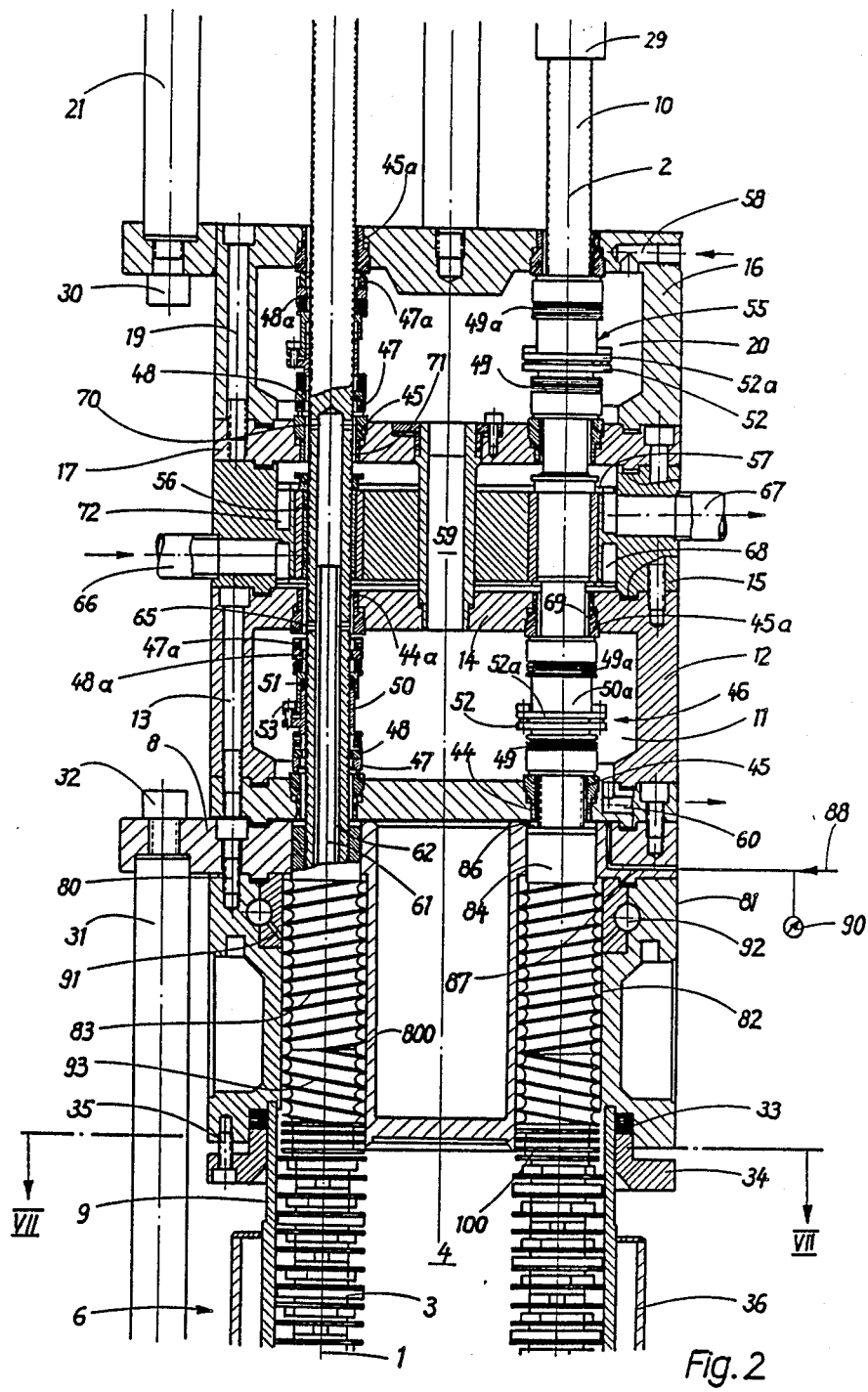
Figure 3:
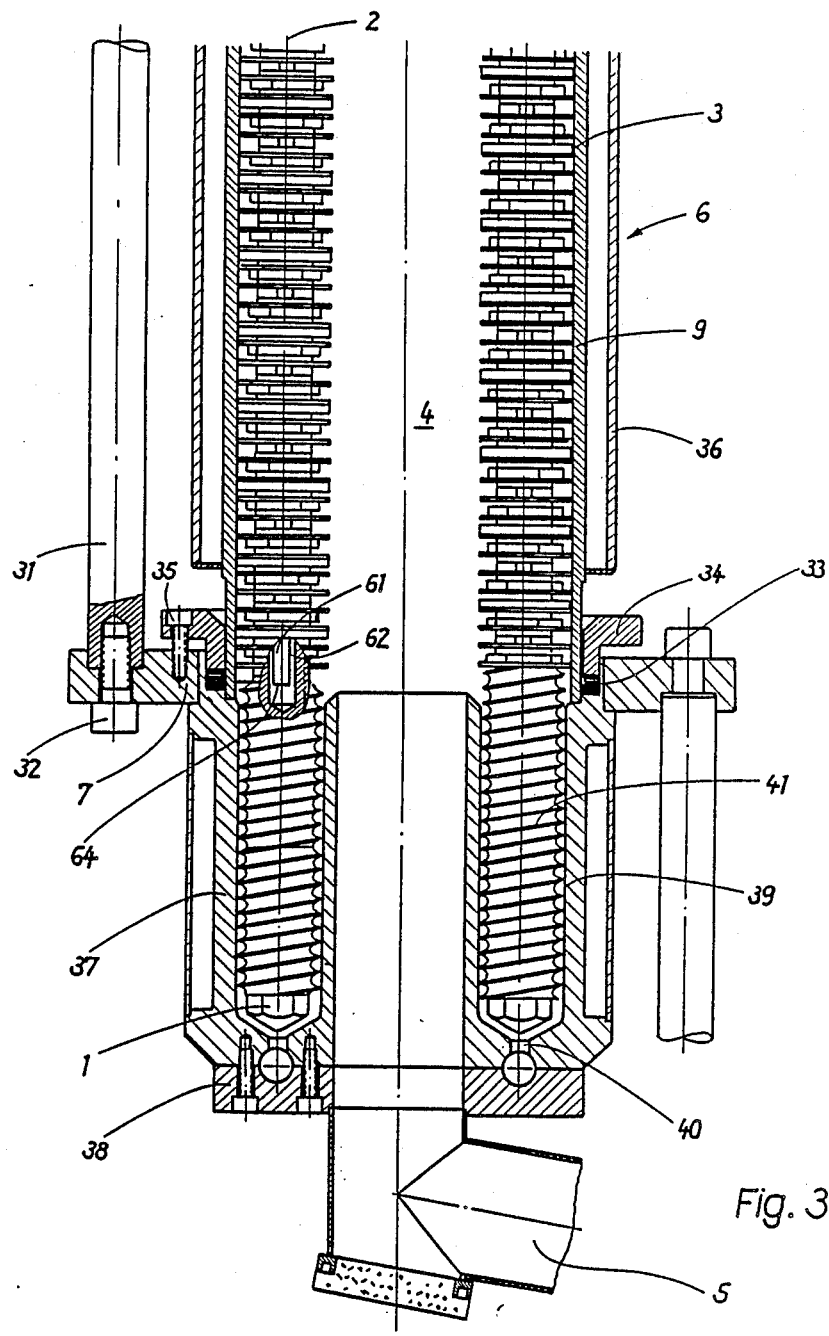
Figure 4:
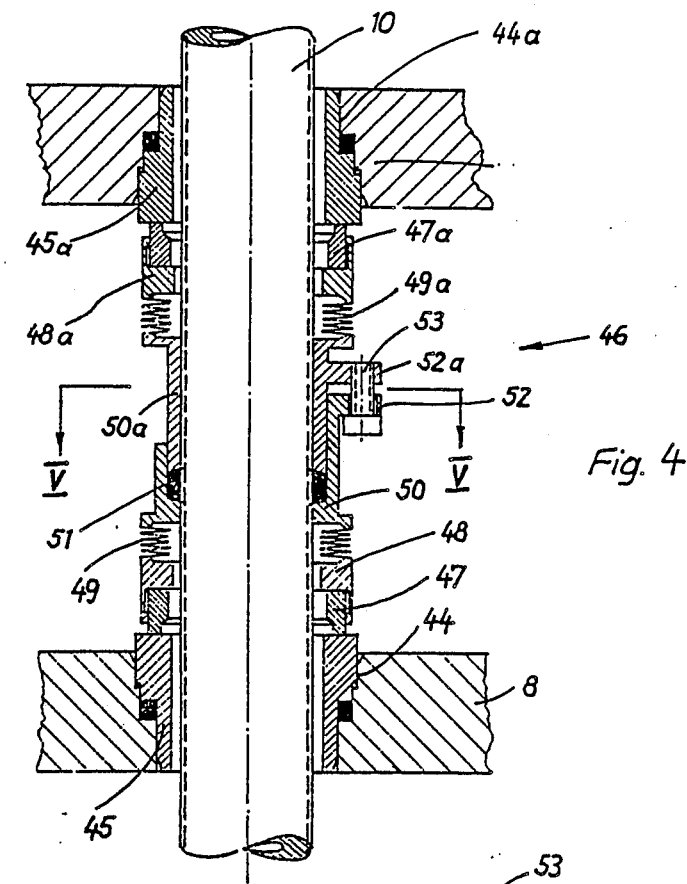
Figure 5:
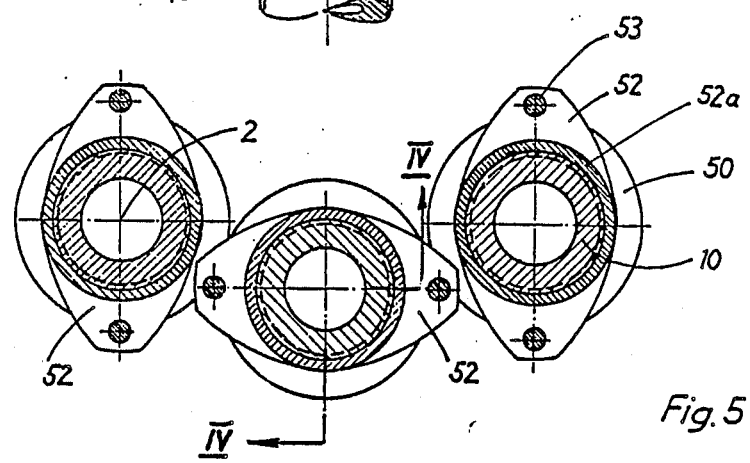
Figure 6:
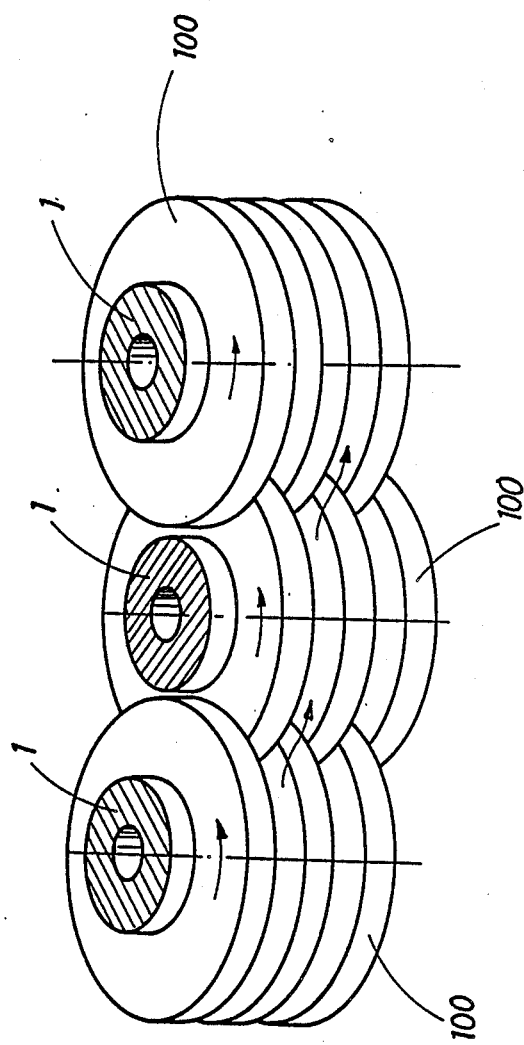
Figure 7:
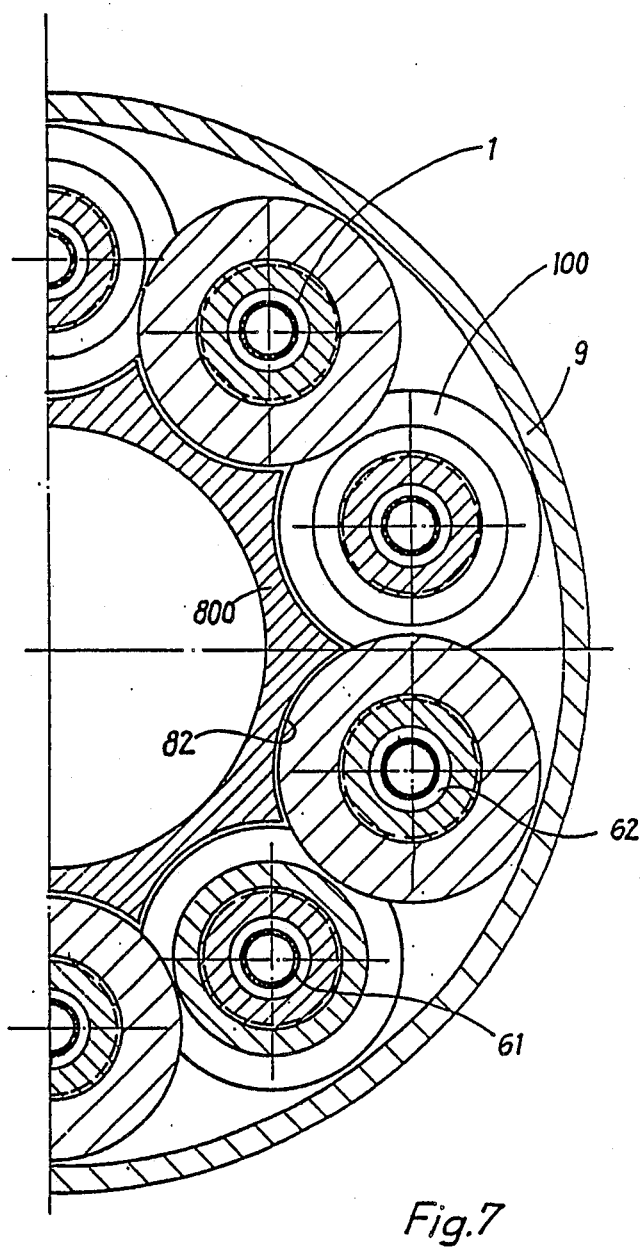
Figure 8:
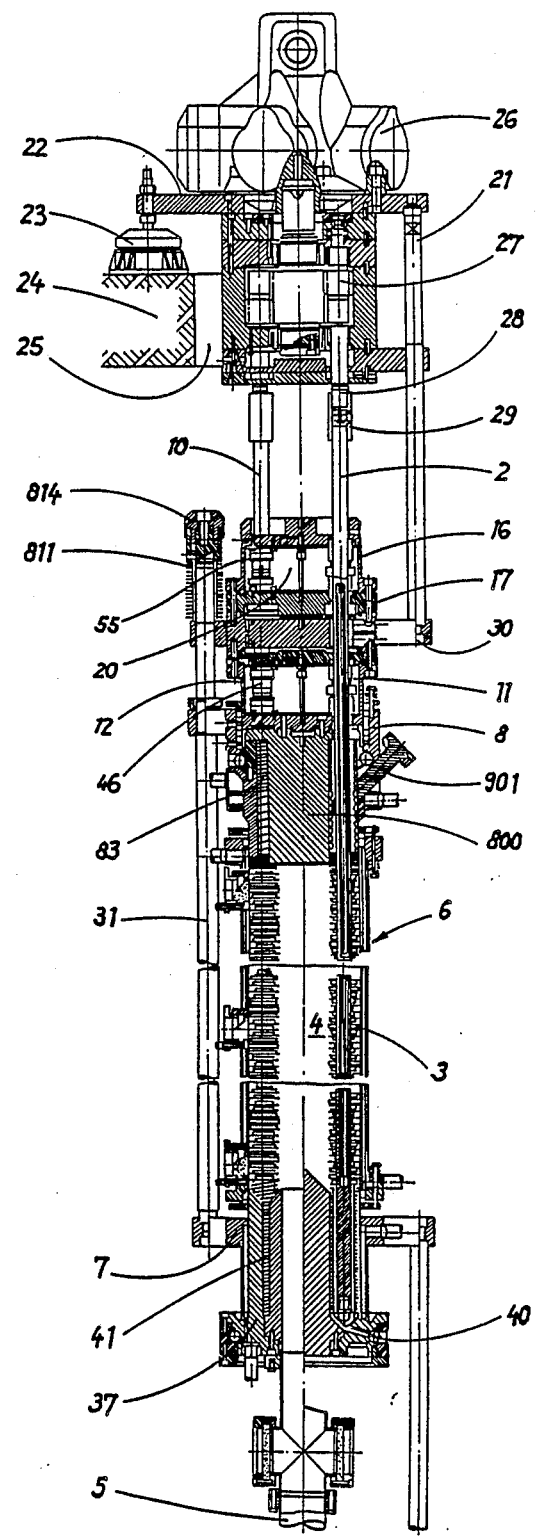
Figure 9:
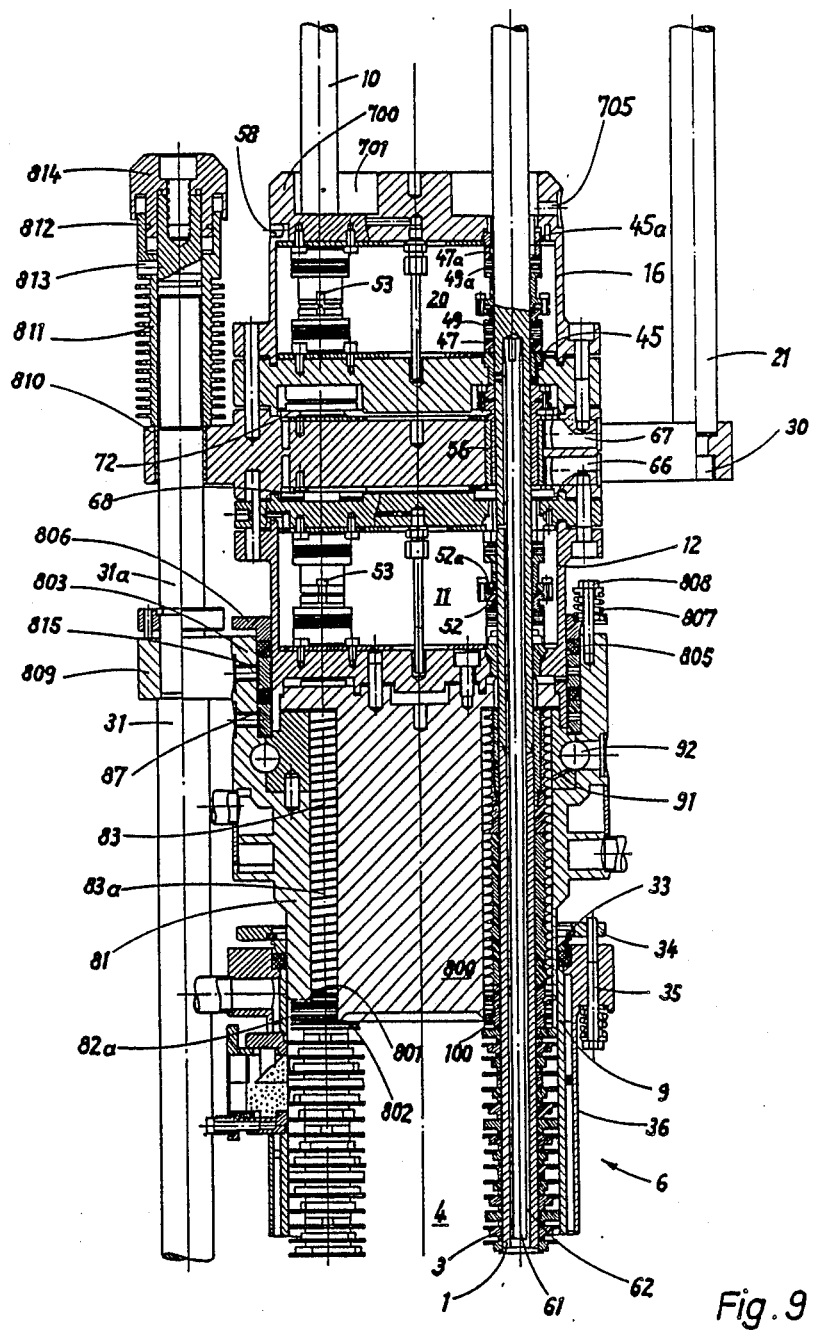
Figure 10:
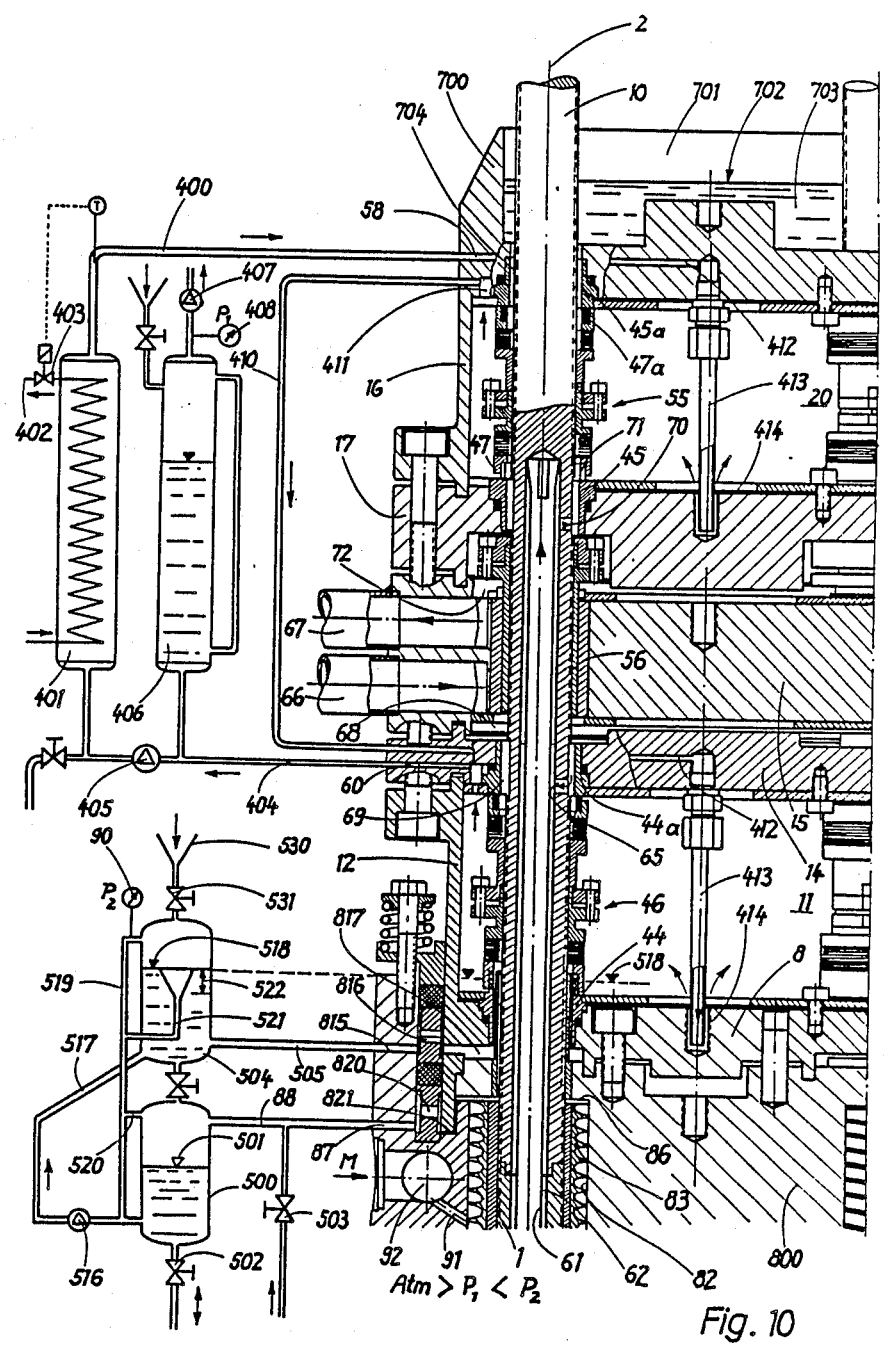
Figure 11:
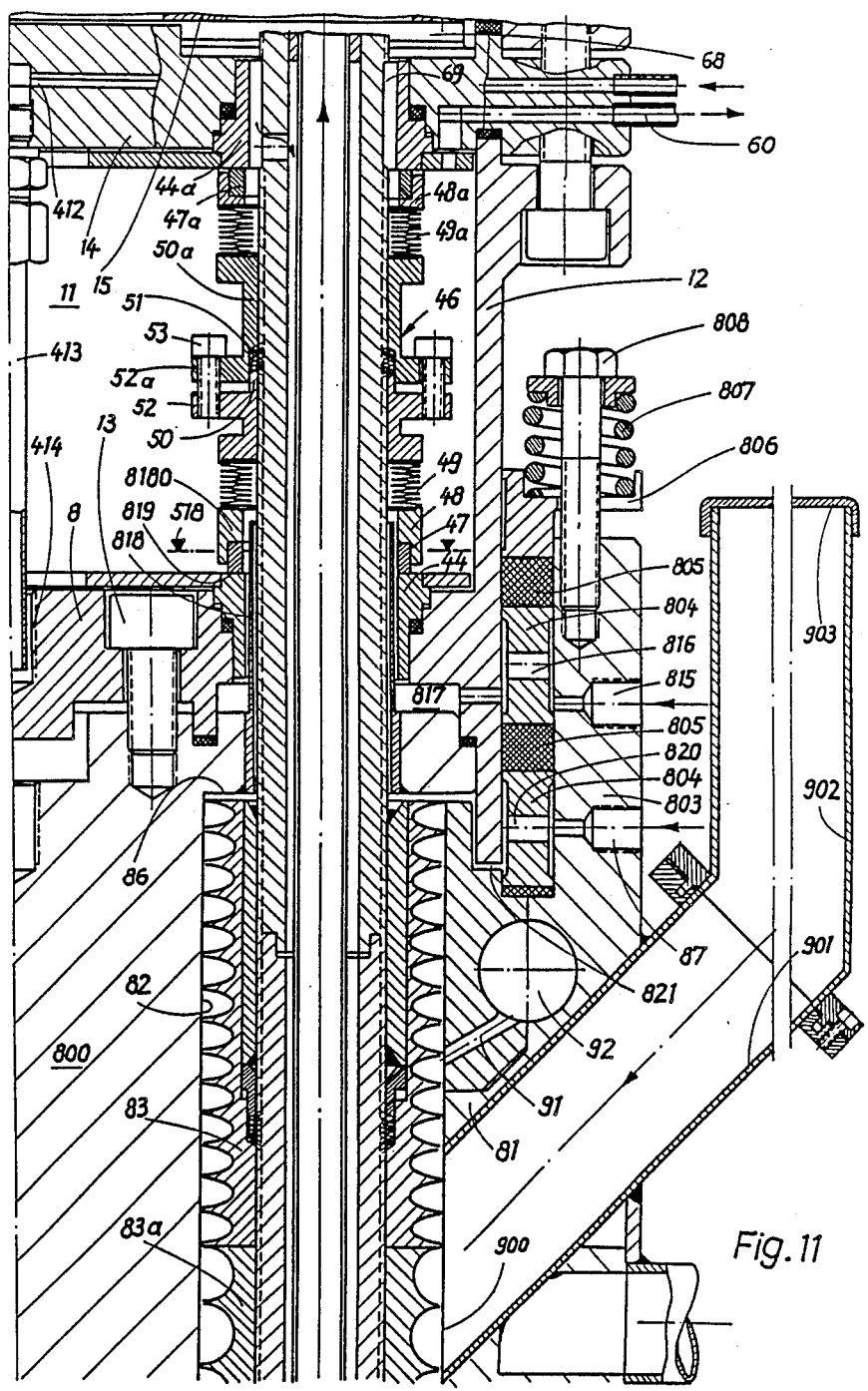
Figure 12:
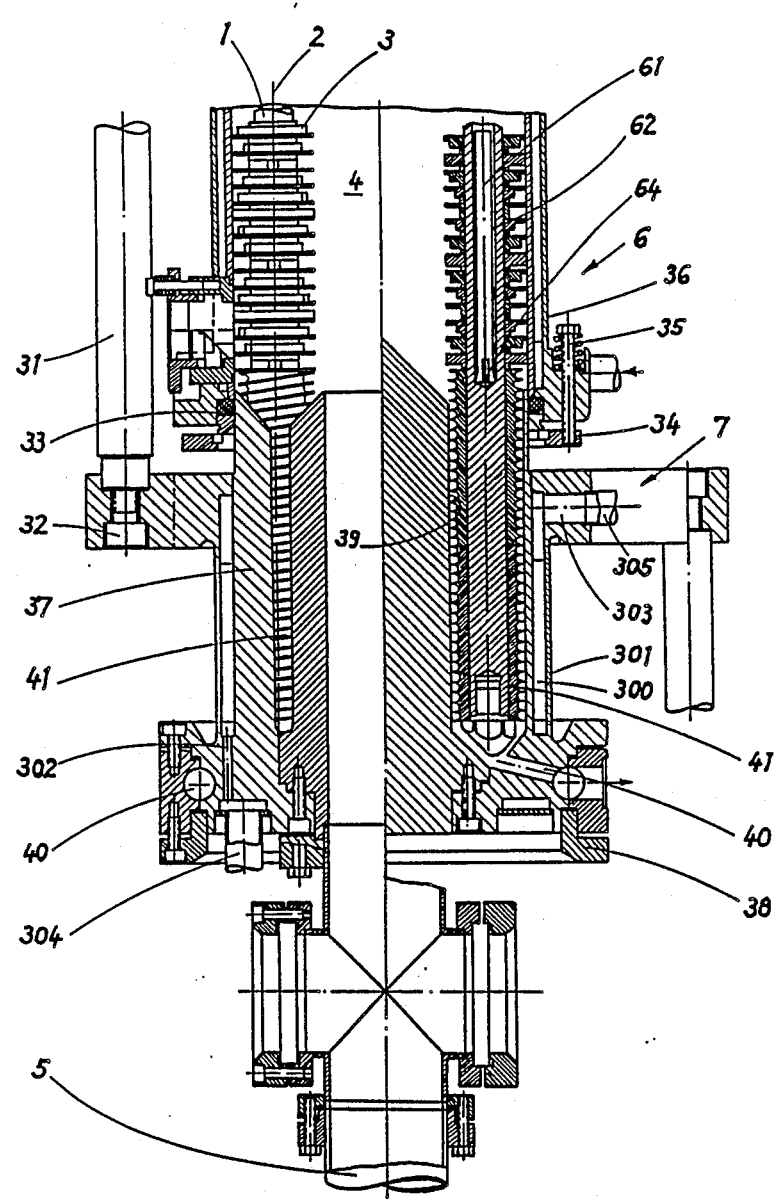

In the drawing, exemplary embodiments of the subject of the invention are shown. Shown are:

FIG. 1, an apparatus ("reactor") for the condensation of polyester, having shaft seal assemblies in accordance with the invention, in an axial section seen from the side;

FIG. 2, an upper portion of the apparatus of FIG. 1, in an axial section seen from the side, on a different scale;

FIG. 3, a lower prtion of the apparatus of FIG. 1, in an axial section seen from the side, on a different scale;

FIG. 4, a double slide ring bearing of the apparatus of FIG. 1, in a fragmentary side view of a section taken along the line IV—IV of FIG. 5;

FIG. 5, the arrangement of FIG. 4, in a plan view of a section taken along the line V—V of FIG. 4;

FIG. 6, the intermeshing disks, located adjoining the reversing elements of the apparatus of FIG. 1, of three shafts of the apparatus of FIG. 1, seen in a fragmentary perspective view on a different scale;

FIG. 7, the arrangement of FIG. 2, in a plan view on a different scale, of a fragmentary section taken along the line VII—VII;

FIG. 8, the apparatus of FIG. 1, with shaft seal assemblies in accordance with the invention, in a modified second exemplary embodiment, in an axial section seen from the side;

FIG. 9, an upper portion of the apparatus of FIG. 1, in axial section, seen from the side and on a different scale, and in an illustration corresponding to FIG. 2;

FIG. 10, the arrangement of FIG. 9, in a fragmentary axial section seen from the side, on a different scale, showing the peripheral devices in addition to the shaft seal assemblies;

FIG. 11, a different upper portion of the apparatus of FIG. 8, in a fragmentary cross section seen from the side, on a different scale; and FIG. 12, a lower portion of the apparatus of FIG. 1, in an axial section seen from the side, and on a different scale, and in an illustration similar to FIG. 3.

The apparatus shown in FIGS. 1–7 for producing high molecular weight polymers, in particular for condensing polyester, has ten vertically oriented, axially parallel shafts 1, which are located with their axes 2 in a ring on a shared imaginary circular cylinder, and each of which shafts has a relatively large number of disk-like processing elements 3 located one after the other in the axial direction and in parallel planes, the shape and structure of these elements being described for instance in German Patent No. 30 30 541 and in principle being equivalent to the form of the elements shown in FIG. 1. With these disk-like processing elements 3, neighboring shafts intermesh with one another, forming narrow gaps of a defined width of approximately 0.5 mm. In common with the shafts 1, the processing elements 3 enclose an interior space that forms the reaction chamber 4 and is connected via a suction fitting 5 to a source of a vacuum, not shown in further detail. The shafts 1 are surrounded in common by a housing 6, which comprises two stationary, disk-shaped housing portions 7, 8 and one tubular, cylindrical housing jacket 9, which is sealed off at the ends by the housing portions 7, 8. The shafts 1 are passed with cylindrical shaft ends 10 through corresponding bores of the housing portion 8 and are sealed off by sealing means, to be described in further detail below, in the vicinity of these ducting devices, such that the entry of air or contaminants into the chamber enclosed by the housing jacket 9, and in particular the reaction chamber 4, is precluded.

On the disk-shaped upper housing portion 8, a hollow, substantially cylindrical partial housing 12 containing a first confining-liquid chamber 11 is mounted in a sealed manner, being braced by means of axial bolts 13 to the housing portion 8, and the end wall 14 of the partial housing is adjoined by a second annular partial housing 15 in a sealed manner. A third partial housing 16 is also mounted in a sealed manner on the second partial housing 15, the disk-shaped bottom wall 17 of the third partial housing being braced with respect to the second partial housing 15 via axial bolts 18 and in turn being screwed to its bottom wall 17 in a sealed manner via axial bolts 19. In the third partial housing 16, a second confining-liquid chamber 20 is formed; all three partial housings 12, 15, 16 are formed with aligned bores for the passage therethrough of the shaft ends 10, which are sealed off in a manner to be described below. The third partial housing 16 and thus the entire apparatus is suspended on a pedestal disk 22 via bolts 21 distributed all the way around it, and the pedestal disk 22 is supported via leveling feet 23 on a cover construction or a corresponding carrier 24, having a corresponding through opening 25, and a drive motor 26 is disposed on the pedestal disk 22. The drive motor 26 drives a distributor gear 27, located inside the through opening 25 and secured suspended from the pedestal disk 22; the distributor gear 27 has ten driveshaft journals 28 associated with the individual shafts 1 and located axially parallel to them, each of these journals being detachable via a coupling sleeve 29 but coupled in a torsion-proof manner with an associated shaft end 10. The distributor gear 27 is designed such that the drive motor 26 imparts a rotational movement in the same direction at the same speed to the shafts 1 via the distributor gear 27.

A jack ring 290 disposed on the face end of the third partial housing 16 makes it possible, after the loosening of the screw means 30 of the bolts 21, to remove the portion of the apparatus contained in the housing 6 and in the partial housings 12, 15, 16 form the distributor gear 27 as a unit and for example clean it, as will be described in further detail hereinafter.

The two disk-like housing portions 7, 8 are axially baced against one another and joined together in a torsion-proof manner by means of axially parallel columns 31 distributed all around them and spaced apart from one another, these columns being screwed to the housing portions 7, 8 at their end face at 32. Ring seals 33, which are braced by thrust rings 34 and axial bolts 35 in the axial direction against the housing portions 7, 8, assure a vacuum-tight sealing between the housing jacket 9 and the mounted housing portions 7, 8.

The cylindrical housing jacket 9, comprising special steel, for example, is capable of being heated. To this end, it is formed with double walls over the greater part of its length; the outer wall is indicated at 36. The annular chamber closed at its end and defined by this outer wall 36 and by the housing jacket 9 is provided with inlet and outlet devices, not shown in further detail, for a thermal medium such as thermal oil. By suitable regulation of the temperature of this thermal medium, the heating temperature of the housing jacket 9 can be kept precisely to a predetermined value or controlled in accordance with a predetermined program.

The lower housing portion 7 has a housing part 37 which is closed off at its end by a cap 38, and in which part cylindrical bores 39 associated with the individual shafts 1 are located, the bores communicating in their bottom region, via connecting and annular conduits 40, with a removal device, not shown in further detail for the product to be processed. On their ends located in the bores 39, the shafts 1 have feed screws 41 mounted in a torsion-proof manner, which are surrounded with slight play by the bore walls and which feed the product to be processed from the reaction chamber 4 into the connecting and annular conduits 40 and from there to the removal device.

Each of the processing elements 3, in the manner explained in German patent DE-PS No. 30 30 541 or the earlier patent application No. P 34 30 885.7, has a circular portion with two opposed plane surfaces, one likewise disk-like and substantially oval part located coaxially with them, and one following and also coaxial spacer disk. At least at intervals, the oval disk parts can also be replaced by merely circular disc-like processing elements, or may be provided in alternation with them. In each case, the processing elements, similarly to what is shown in FIG. 5, with one another in such a manner that narrow gaps of a predetermined width (approximately 0.5 mm) are formed between the end and circumferential surfaces moving toward one another of all parts of processing elements that cooperate with one another.

The arrangement is selected such that the tubular housing jacket 9, with its cylindrical inner wall, extends as far as the cylindrical circumferential surface of the processing elements 3, except for a narrow gap left free. The width of this gap is approximately 0.5 mm and is also substantially precisely as large as the width of the aforementioned gaps existing between the processing elements 3. The inner wall of the housing jacket 9 thus extends at a tangent to the circular-cylindrical circumferential surfaces of the processing elements 3.

The sealing of the shaft ends 10, fed through the upper housing portion 8 to the outside, with respect to the housing 6 is designed in the manner particularly shown in FIGS. 2 and 4–7:

Inserted into each through bore 44 for one shaft end 10, sealed off in the upper housing portion 8, is one annular sealing element integral with the housing, of a slide ring seal 46, on the sliding surface of which a coaxial sealing ring 47 is supported via a corresponding sliding surface, the sealing ring 47 being pressed via a thrust ring 48 and an elastic metal bellows 49 with spring biasing against the sealing element 45.

The slide ring bearing 46 is embodied as a double bearing; a correspondingly annular sealing element 45a is inserted in a sealed manner into the associated shaft throughbore 44a of the wall 14. Its associated sealing ring is identified as 47a; it is pressed in the axial direction against the sealing element 45a via a metal bellows 49a and a thrust ring 48a. The two bellows 49, 49a are supported on the side facing one another on a respective thrust bushing 50 or 50a, the two thrust bushings 50, 50a meshing with one another in the manner show in FIG. 4 and being braced in the axial direction against a prepressed carbon ring seal 51. To generate this axial bracing, the two thrust bushings 50, 50a are provided in the manner shown in FIG. 5 each with a respective flange 52 or 52a, which basically has the same shape as one of the "oval" processing elements. The flanges 52, 52a of adjacent shafts 1 can therefore mesh with one another; with each shaft, they are braced to one another and joined in a torsion-proof manner by tie bolts 53. The shaft ends 10 are also formed with a multi-wedge profile, by way of which they are coupled in a torsion-proof manner with the thrust bushings 50, 50a, which are formed correspondingly, in such a manner that the bellows 49, 49a and the sealing rings 48, 48a revolve with the shaft ends 10.

A corresponding slide ring seal 55, embodied as a double seal, is located in the third partial housing 16 and identical elements are identified by the same reference numerals, so that to this extent the description need not be repeated.

Between the two slide ring seals 46, 55, each embodied as a double seal, one radial slide bearing 56 is provided in the second partial housing 15 for each of the shaft ends 10, this bearing producing a radial guidance of the shafts 1 in this region and preventing buckling of the shaft. Annular shoulders 57 also assure an axial fixation of the shafts 1 with respect to the second partial housing 15, when the entire unit is raised at the jack ring 290.

Discharging into the second confining-liquid chamber 20 formed in the third partial housing 16 is a confining-liquid feed conduit 58; it also communicates via a central conduit 59, passing in a sealed manner through the second partial housing 15, with the first confining-liquid chamber 11, from where a confining-liquid outlet conduit 60 leads to the outside. The two confining-liquid chambers 11, 20 are filled with a confining liquid, such as oil, and are kept at a predetermined vacuum. It is thereby attained that confining liquid cannot escape to the atmosphere but at most some air can enter into the confining-liquid chambers 20, 11 via the slide ring seal units 45a, 47a located at the top of the slide ring seal 55, and so these sealing points remain "dry" with respect to the atmosphere.

The shafts 1 are drilled hollow; each of them contains an axial tubule 61, while defines an annular chamber 62 and terminates in the vicinity of the feed screws 39 at 64 (FIG. 3). A thermal fluid, such as oil, is introduced into each of the annular chambers 62 via radial bores 65 in order to cool the shafts; this fluid is supplied via a connection 66 to the second partial housing 15 and from it is removed via a connection 67. The thermal fluid entering via the connection 66 flows into an annular conduit 68, which partially surrounds the radial bearing 56, so that a cooling of the radial bearing takes place. From the annular conduit 68, the thermal fluid passes via annular gaps 69 to the radial bores 65 and thus reaches the annular chambers 62 of the shafts 1.

The thermal fluid diverted at 64 flows upward via the tubules 61 and via radial bores 70 enters a respective annular gap 71 in the vicinity of the associated slide ring seal, and from there is flows via the interior of the second partial housing 15 and a second annular chamber 72 to the outlet connection fitting 67. The second annular conduit 72 also surrounds the radial bearing 56, with the result that the radial bearing undergoes further cooling, and in this respect it should be noted that the thermal fluid, dispite the heating taking place in the shafts 1, still has a sufficiently lower temperature, of approximately 300° C., for cooling the seals and bearings. As it flows through the annular gaps 69, 71 a cooling of the associated elements of the slide ring seals 46 or 55 also takes place.

Of the thermal fluid supplied via the annular conduits 68 at a pressure of for example 3 bar, some thermal fluid can enter via the annular gaps 69 and the following parts 47a, 45a of the slide ring seal 46 into the first confining-liquid chamber 11 in which a substantially lower pressure prevails. This is desirable and is harmless. In a similar manner, thermal fluid from the outlet-side annular conduit 72 can enter via the annular gaps 71 into the upper or second confining-liquid chamber 20 at its somewhat lower pressure (for example 2 bar), which is again harmless.

Finally, the radial bearings 56 act as a "partition" or "barrier" between the confining-liquid inlet and outlet via the annular conduits 68, 72, and leakage can be taken in stride, the leakage being on the one hand relatively slight and thus easily controlled by the circulating pump and on the other hand effecting lubrication of the radial bearings 56.

On the side oriented toward the reaction chamber 4, the upper housing portion 8 has a coaxial bearing part 81 mounted in a sealed manner by means of axial bolts 80 and in which bearing part cylindrical bores 82 asscciated with the individual shafts and coaxial with them are formed, and the bearing part 81 is connected to the housing jacket 9 in a sealed manner by means of the thrust ring 34. Each of the shafts 1 has a feed screw 83 mounted in a torsion-proof manner and located in the associated bore 82; in the axial direction, this feed screw adjoins a cylindrical bearing bush 84, with the bore wall defines a small annular bearing gap, which together with the bearing bush 84 at the bottom wall of the first partial housing 12 defines annular chambers 86 into which inert gas feed conduits 87 discharge, these conduits communicating with a common inert gas feed connection 88 that communicates with a source of inert gas, not shown in further detail. A measuring instrument 90 makes it possible to monitor the quuantity of inflowing inert gas.

Discharging into the bores 82 in the vicinity of the feed screws 83 are connecting conduits 91, which begin at an annular conduit 92 that forms part of a feed device for material to be processed, by way of which the material is supplied at a predetermined pressure.

As seen in FIG. 2, the connecting conduits 91 discharge at the circumference of the feed screws 83 spaced apart by several screw courses from their face end.

Adjoining the feed screws 83 in the direction toward the processing tools 3 are respective reversing screws 93, which likewise are located at least for the most part inside the bores 82 and are connected in a torsion-proof manner with the shafts 1. The reversing screws 93 have a screw course pitch in the opposite direction from that of the feed screws 83, so that when the shafts 1 are driven in the operating direction the reversing screws have the tendency to feed the material to be processed, which is fed by the feed screws 83 in the direction toward the reaction chamber 4, in the opposite direction. Since the axial length of the feed screws 83 is greater than that of the reversing screws 93, the feed pressure predominates, with the result that the feed screws 83 "push" the supplied material to be processed all the way through the screw courses of the reversing screws 93 acting in the opposite direction. At the same time, however, in the vicinity of the screw courses of the feed screws 83, the product to be processed is subjected to a predetermined pressure.

This pressure is utilized for sealing off the inert gas cushion, surrounding the shafts 1 adjoining the lower partial slide ring seal 45, 47 in the chamber 86, with respect to the reaction chamber 4 by means of the material to be processed itself. The pressure of the inert gas cushion, which is maintained via the incoming line 88 is higher than the pressure of the confining-liquid in the adjoining confining-liquid chamber 11, with the result that confining liquid cannot enter into the bores 82 via the partial slide ring seal 45, 47 and from there get into the reaction chamber 4. Instead, some inert gas (for example nitrogen) will enter into the confining-liquid chamber 11, from where it is harmlessly carried out along with the confining liquid.

In the region in which the shafts 1 emerge from the bores 82, a number (4) of circular ring disks 100, stacked one above the other spaced apart in the axial direction, is mounted on each shaft; these disks mesh with one another in the manner shown in FIG. 6, such that between respective adjacent surfaces of cooperating disks, narrow gaps of a precisely predetermined width (approximately 0.5 mm) are formed. As particularly shown in FIGS. 2 and 7, the walls of the bores 82 extend on the inside oriented toward the reaction chamber 4 in the axial direction approximately as far as the middle of each stack of disks 100, while on the outside the adjacent housing jacket 9 extends over the entire axial length of such a stack of disks. Between the disks 100 and the housing jacket 9, a suitable space is left free.

In operation, as already noted, an inert gas cushion is maintained in the bores 82, by way of the supplied inert gas for each shaft 1, adjacent to the sealing means formed by the slide ring seals 46; this cushion is itself sealed off with respect to the reaction chamber 4 by means of the material to be processed, which is put under pressure by the reversing screws 93. The consumption of inert gas is slight and substantially constant; should it suddenly rise, this is an indication of damage in the seal, requiring repair.

The material to be processed, which is fed past the reversing screws 93, is spread out by the intermeshing disks 100 into thin films, which completely fill the thin gaps existing between the disks 100 themselves and between the disks and the wall of bores 82, and thus further improve the sealing of the inert gas cushion. The inert gas cushion, which is under pressure, in turn reinforces the feeding action of the feed screws 83.

At the same time, the disks 100 prevent material to be processed from reaching the reaction chamber 4 in the form of thicker layers. For this reason, the walls of the bores 82 on the side facing the reaction chamber are also extended forward only as far as approximately half the axial length of the stack of disks.

Because the thermal fluid, which becomes hot to the extent of approximately 350° C., is fed to and removed from the shafts 1 radially in the region between the reaction chamber 4 or the housing 6 and the distributor gear 27, the advantage is attained that the distributor gear 27 cannot be heated by the thermal fluid, and furthermore the pinion gear contained in the distributor gear 27 does not have to be weakened by bores forming conduits for the thermal fluid. Thus axial bearings can also be disposed in distributor gear 27.

The entire construction offers the further advantage that the actual reactor enclosed by the housing 6 can be removed as a unit from the drive mechanism comprising the drive motor 26, the distributor gear 27 and the shaft couplings 29, etc., as may be required for example for cleaning.

In the example of an electrical failure, for example, the entire reactor is threatened by carbonization. To provide a remedy here, the reactor located in the housing 6 can first be removed from the aforementioned drive mechanism, after the screw connections are loosened, and then after loosening of the thrust ring 34 and the screw bolts 32, the shafts 1 along with the "seal head", formed by the partial housings 12, 15, 16 and the upper housing portion 8, can be lifted up and out of the housing 6 at the jack ring 290.

In this manner, it is possible either to immerse the entire reactor into a salt bath or to put the shafts 1 along with the seal head and the housing 6 in the salt bath separately from one another, for cleaning or for recleaning as applicable.

Since the slide ring seals 46, 55 are designed for a long-term temperature of approximately 450° C., predetermined by the metal bellows 49, 49a, and the sealing material (pure graphite) used for the static housing seals is temperature resistant up to 1100° C., cleaning in a salt bath, the temperature of which is typically approximately 350° C., is readily possible, which is a particular advantage. Especially in short-time polymerizations, which take only a few minutes, an electrical failure can in fact mean that the shafts 1 and the entire reactor as a whole can become truly "embedded" in the carbonized polymer within a short time, with the result that its parts can no longer be removed without destroying or damaging them. In that case, cleaning in the salt bath is the only possible remedy; and precisely with the above-described construction, this is readily possible.

The modified embodiment of a reactor shown in FIGS. 8–12 substantially corresponds to the first embodiment described in connection with FIGS. 1–7. Elements that are the same or equivalent are therefore identified by the same reference numerals, and so they do not need to be described again. Also, for the sake of simplicity, only the essential reference numerals are used in FIGS. 8–12

While in the first exemplary embodiment of FIGS. 1–7 the upper disk-like housing portion 8 is embodied in one piece and disposed stationary as a whole, in the modified exemplary embodiment of FIGS. 8–12 the upper housing portion 8 is in several parts and is embodied such that it is partly axially displacable. Similarly to FIG. 2, the housing portion 8 has an inside part 800 surrounded by the shafts 1 disposed in a ring, on the circumference of which part the cylindrical bores associated with and coaxial with the individual shafts 1 are distributed over a portion of their circumference in the manner shown in FIG. 7. The hollow, substantially cylindrical partial housing 12 containing the first confining-liquid chamber 11 is also again mounted on the housing portion 8 in a sealed manner, being braced by means of suitable axial bolts 13 to the housing portion and thus held in a stationary manner. The bearing part 81 coaxial with the housing portion 8, which bearing part annularly surrounds the inner part 800 and the cylindrical partial housing 2 on the outside, is axially displacably supported in a sealed manner on the cylindrical outer wall of the partial housing 12. On its inside facing the feed screws 83, together with the inner part 800, it defines the bores 82, but the arrangement is selected, as shown in FIG. 9. such that the bearing part 81 has a shorter axial length than the inner part 800, such that when the bearing part 81 is in one boundary position shown in FIG. 9, its end face 801 oriented toward the reaction chamber 4 extends spaced axially apart from the adjoining end face 802 of the inner part 800. Bearing and guidance of the bearing part 81 is provided by a integrally molded coaxial bearing ring 803, which with respect to FIG. 11 extends axially upward from the bearing part 81 and is radially supported against the cylindrical outer face of the partial housing 12 via intermediate rings 804, between which, as between the intermediate rings 804 and the bearing part 81, as well as a thrust ring 806, elastic sealing rings 805 are provided. The thrust ring 806 is axially braced against the intermediate rings 804 via compression springs 807 and clamping bolts 808 via the sealing rings 805, resulting in a fluid-tight sliding guidance. The bearing part 81 also has radially protruding bearing eyes 809 distributed around its circumference, in which the axially parallel columns 31 that connect the two housing portions 7, 8 rigidly to one another are anchored. At least one of the columns 31 is axially extended and is connected to an integrally molded shaft stub 31a, which is supported in a displacable and sealed manner in a second stationary bearing eye 810, on which a thrust cylinder 811 is mounted into which the shaft stub 31a, formed as a piston, protrudes. The cylinder 811 is closed off by a cylinder head 812, to which pressure fluid can be delivered via a pressure fluid line 813, the pressure fluid axially acting upon the shaft stub 31a, and this exertion of pressure can be affected by means of a control valve 814 provided in the cylinder head 812. By suitable actuation of the control valve 814, it is thus possible via the shaft stub 31a to axially adjust the bearing part 81, radially surrounding the feed screws 83 on the outside, along with the lower housing portion 7, that is, the housing 6, continuously with respect to the shafts 1 over a reciprocating path, defined by stops.

The wall portion of the bores 82 formed on the inner part 800 extends in the manner shown in FIG. 9 somewhat beyond the middle of the axial length of the stack of disks 100, which stack thus extends into the respective bore 82 in such a manner that the circular ring disks 100, disposed axially spaced apart, form throttle elements for the product to be processed that is fed by the feed screws 83. The throttling action of the stack of discs can now be varied by axially adjusting the bearing part 81 containing the outer wall portion of the bores 82 in the manner described. In the upper boundary position shown in FIG. 9, the circular ring disks 100 are laid bare on the outside over the greater portion of the stack length in the vicinity of the wall portions of the bore 82 formed in the bearing part 81, so that the product to be processed can emerge unhindered into the relatively large portion of the annular gap 82a. If the bearing part 81 is adjusted axially farther downward as seen in FIG. 9, then its end edge 801 also moves farther downward, so that the widened annular gap 82a is axially shortened, and thus the throttling action exerted by the stack of disks upon the material to be processed that has been fed is increased.

In this manner, it is possible to adapt the backpressure of the material to be processed, in the vicinity of the inert gas cushion, to the viscosity of the particular material being processed.

In the embodiment of FIGS. 8-12, the contrary feed screw 93 on the embodiment of FIGS. 1-8 bas been omitted, and replaced by a feed screw 83a that feeds in the same direction as the feed screw 83, but its screw courses have a larger cross section than those of feed screw 83, as will be described in detail below. In principle, naturally it would be possible in this embodiment as well to provide contrary feed screws 93 following the feed screws 83 for each shaft, in order to generate the backpressure on the part of the material to be processed required for sealing off the inert gas cushion.

In order to lubricate the cooperating slide ring sealing surfaces at the annular sealing element 45 and the associated sealing ring 47 of the slide ring bearing 16 adjacent to the feed screw 83 and thereby prevent dry friction and excessive wear caused by it, a lubricant fluid, in particular oil, is supplied continuously to these slide ring bearings. To this end, a lubricant fluid feed conduit 815 is formed in the bearing ring 803, leading via a through conduit 816, discharging on both ends into axial distributor grooves, in the associated intermediate ring 804 and an inflow conduit 817 formed in the partial housing 12 into an annular conduit 818, which is defined by a guide sleeve 8180 (FIG. 11), surrounding the respective shaft 1 at a radial distance, and by the inner wall of the bore of the sealing element 45 and which leads to the sealing ring sealing surfaces at 819. The annular chamber 86 is again subjected to inert gas, the feed conduit 87 of which, via a through conduit 820 discharging on both ends into axial distributor conduits, in the adjacent intermediate ring 804 and an annular conduit 821 communicating with the intermediate ring 804, is subjected to inert gas in such a manner that each of the shafts 1, in a manner already described is surrounded by a cushion of inert gas, as already described in detail, in the vicinity of their slide ring seal 46 adjoining the feed screw 83.

As shown in FIG. 10, the inert gas feed line 88 connected to the inert gas feed conduit 87 is connected to a first lubricant fluid vessel 500, such that it discharges above the level of lubricant, indicated at 501. The lubricant fluid vessel 500 communicates on its underside, via a valve 502, with a lubricant fluid supply container, not shown in further detail, from which an inert lubricant fluid, which withstands heat up to approximately 280° C., can be supplied on demand. Branching off from the inert gas feed line 88, via a regulating valve 503, is a connecting line leading to a source of inert gas, not shown. The regulating valve 503 makes it possible to maintain the particular inert gas pressure required.

Above the lower lubricant fluid vessel 500, there is an upper second lubricant vessel 504 which is also partly filled with lubricant fluid and which in its lower portion communicates on the one hand, via a line 505, with the lubricant fluid feed conduit 815 and on the other hand, via a line 517 containing a recirculating pump 516, with the lower portion of the lower lubricant fluid vessel 500. A connecting line 519 discharging into the space above the fluid level 518 of the upper lubricant fluid vessel 504 branches off on the intake side of the recirculating pump 516, communicating at 520 with the space located above the fluid level 501 of the lower lubricant fluid vessel 500 and being connected to the pressure measuring instrument 90 that indicates the inert gas pressure p2. Branching off from the connecting line 519 is an overflow line 521 extending into the fluid space of the upper lubricant fluid vessel 504 and discharging in funnel-like fashion at its end; this line 521 determines the height of the fluid level 518. The overflow line 521 is adjustable in height with its orifice that determines the fluid level 518, as indicated by a double arrow 522.

Via the lines 88 and 519, the lubricant fluid contained in the two lubricant fluid vessels 500, 504 is subjected to the pressure of the inert gas cushion. The recirculating pump 516 keeps the lubricant fluid in circulation continuously, so that in the upper lubricant fluid vessel 504 the fluid level 518, which is determined by the height at which the orifice of the overflow tube 521 is located, continues to be maintained continuously.

The height of this fluid level 518 is selected such that it is always above the slide ring seal surfaces 819, as FIG. 11 shows. In this way it is assured that the slide ring seal surfaces at 819 are always supplied with lubricant fluid. Lubricant fluid emerging from between the slide ring seal surfaces reaches the confining-liquid chamber 11, where it is removed along with the confining liquid. The pressure p2 to which the lubricant fluid is subjected, is greater than the atmospheric pressure and is determined by the pressure of the inert gas cushion.

The lubrication of the slide ring seal surfaces located between the annular sealing element 44a and the sealing ring 47a of each slide ring seal 46 as well as between the sealing element 45 and the associated sealing ring 47 of each upper slide ring seal 55 is effected, as in the exemplary embodiment of FIGS. 1–7, by means of the thermal fluid (thermal oil) flowing through the hollow-drilled shafts 1, which is supplied to the second partial housing 15 via the connection 66 and from there is removed via the connection 67 (FIG. 10). To this extent, the situation is the same as in the first embodiment. Accordingly, please see the explanation therefor on page 18 ff. As already noted, identical or equivalent elements in the two embodiments are provided with identical reference numerals.

For lubricating the slide ring seal surfaces between the sealing element 45a and the associated sealing ring 47a of each of the upper slide ring bearings 55, finally, a separate lubricant fluid supply is also provided. To this end, the third partial housing 16 mounted on the second partial housing 15 is provided, in the vicinity of its upper wall, with an annular flange 700 surrounding it circumferentially, which encloses a fluid supply chamber 701 surrounding all the shafts 1 in the vicinity of their shaft ends 10 and is filled up to a fluid level 702 (FIG. 10) with lubricant fluid 703. The lubricant fluid 703 enters through lubricant fluid conduits 704 into the associated sealing elements 45a and the sealing rings 47a cooperating with them to reach the slide ring seal surfaces located therebetween. The small amount of lubricant fluid passing through in between the slide ring seal surfaces reaches the upper confining-liquid chamber 20, where it is harmlessly admixed with the confining liquid.

The lubricant fluid supply chamber 701 can also be connected to the recirculating pump 516 (FIG. 10) via lines not shown in further detail, so that the lubricant fluid 703 is continuously recirculated and replenished as needed. The lubricant fluid flowing continuously out of the lubricant fluid supply chamber 701 in the course of this recirculation can enter the upper lubricant fluid vessel 504 via a receiving funnel 530, which communicates with the upper lubricant fluid vessel 504 via a regulating valve 531. The associated line connection 705 on the lubricant fluid supply chamber 701 for the line not otherwise shown is visible in FIG. 9.

The lubricant fluid 703 surrounding the shaft ends 10 has the further task, in addition to that of providing lubrication, of forming an odor seal for the shaft ends emerging from the partial housing 16. The confining liquid contained in the confining-liquid chambers 11, 20 in fact contains odor-active components, which with the "breathing" of the slide ring seals 45a, 47a could pass along the shafts 1 to reach the outside and could cause odor pollution in the environment.

The supply of confining liquid to the confining-liquid chambers 11, 20 is effected, in the embodiment of FIGS. 8–12, in such a manner that the confining liquid is continuously kept in circulation and thereby is continuously cooled. The result is a continuous dissipation of heat from the slide ring bearings 46, 55 bathed by the confining liquid.

As particularly shown in FIG. 10, the confining liquid feed conduit 58 to the upper confining-liquid chamber 20 is connected via a line 400 to a heat exchanger 401, the primary loop 402 of which is regulated via a temperature regulator 403 such that the confining liquid flowing out via the line 400 is always kept at a predetermined set-point temperature value. The confining liquid outlet conduit 60 formed in the end wall 14 of the first partial housing 12 defining the lower confining-liquid chamber 11 communicates via a line 404 and a recirculating pump 405 with the inlet-side end of the heat exchanger 401. Discharging into the line 404 on the intake side of the recirculating pump 405 is a confining-liquid supply vessel 406, which is connected to a vacuum pump 407, which keeps the confining liquid at a negative pressure p1 indicated at 408. This negative pressure is selected such that the pressure p1 to which the confining liquid is subjected is lower than the atmospheric pressure and lower than the pressure p2 of the lubricant fluid in the lubricant fluid vessels 500, 504 and of the inert gas cushion.

The two confining-liquid chambers 20, 11 also communicate with one another through a connecting line 410, which is connected to the two confining-liquid chambers 20, 11 via an outlet conduit 411 discharging on the top of the upper confining-liquid chamber 20 and via a feed conduit 412. In each of the two confining-liquid chambers 20, 11, the feed conduit 58 or 412 communicates with a feed tube 413 crossing through the confining-liquid chamber and discharging in a blind-bore-like recess 414 in the bottom of the respective confining-liquid chamber 20 or 11, and the arrangement is selected such that the confining liquid emerging from the feed tube 413 spreads out upward from the bottom of the confining-liquid chamber 20 or 11, as indicated in FIG. 10 by arrows. Since the confining liquid outlet conduit or 60 of each of the two confining-liquid chambers 20, 11 discharges at the top thereof, a longitudinal flow through the confining-liquid chambers 20, 11 is thereby made compulsory.

The confining-liquid chambers 20, 11 are connected serially via the connecting line 410. In principle, an arrangement in which both confining-liquid chambers 20, 11 were connected in parallel to one another and supplied with confining liquid via the recirculating pump 405 and the heat exchanger 401 would also be conceivable.

The viscous product to be processed, which is introduced via the annular conduit 92 and the connecting conduits 91 into the bores 82 and thus into the feed screws 83 is subjected to a predetermined backpressure, as already explained, by means of the reversing screws 93 (FIG. 2) and/or the circular-annular disks 100 (FIGS. 2, 9), so that together with the inert gas cushion this product can at the same time take on a sealing function. The possibility then exists of supplying the feed screws with other materials in addition to the viscous product to be processed, these other matierials being in particular solid additives that are worked into the product, in particular melted plastic, which is to be processed. Such additives depend on the intended use of the product being processed; examples include stabilizers, plasticizers, anti-oxidant agents, fillers, pigments, fibers, flame retardants, expanding agents, and so forth. In plastics processing, admixing the additives in this processing stage makes it possible to dispense with other melting and granulating operations that were previously necessary, when separate compounding mahhines developed for that purpose were used.

To this end, an additives feed line 901 discharges, particularly in the manner shown in FIG. 11, at 900 at an angle of 45° from the vertical into at least one of the bores 82 in the feeding direction, below the associated connecting conduit 91 for feeding the material being processed. This feed line 901 communicates with a funnel-like additive container 902. which is closed off in a vacuum-tight manner by a cap 903. The additive supply container 902 may contain apportioning devices, not shown in further detail, which assure the addition of precise quantities of additives in a preprogrammed manner. The additives contained in the supply container 902 are sealed off from oxygen in the air by the cap 903. The entire container and the feed line 901 are subject to the pressure of the inert gas, which, arriving from the inert gas cushion, passes the courses of the feed screw 83 and enters into the feed line 901 at 900. A direct connection of the supply container 902 to the source of inert gas could also be provided.

Since with the addition of the additives to the product being processed, the product increases in volume, the feed screw 83 is replaced, beginning approximately at the middle of the discharge opening at 900, by a feed screw 83a running in the same direction but having a greater course width.

The removal of the processed product, optionally with the additives provided, from the reaction chamber 4 is effected in both embodiments, that is, that of FIGS. 1–7 and that of FIGS. 8–12, in basically the same manner, as a comparison of the lower portions of the apparatus shown in FIGS. 3 and 12 will show However, since in the embodiment of FIGS. 8–12, as already described, the bearing part 81 along with the housing 6 is connected to the lower housing portion 7, via the cylinder 811 (FIG. 9) in a limitedly longitudinally displaceable manner with respect to the shafts 1 and via the columns 31, the lower housing portion 7 follows along with this kind of axial adjustment of the bearing part 81, this adjustment being made to enable adapting to products of different viscosity that are to be processed. Since the feed screws 41 are axially displaceable in the associated cylindrical bores 39, this axial adjustment is readily possible.

Furthermore, the lower housing portion 37 is surrounded in a sealed manner, over the majority of the axial length of the feed screws 41 extending in it, by a housing jacket 301, forming an annular chamber 300. The annular chamber 300 communicates via conduits 302, 303 with a thermal fluid inlet 304 and a thermal fluid outlet 305, so that it can be continuously subjected to the flow of a thermal fluid through it, which enables keeping the material to be processed at a particular required temperature in the vicinity of the feed screws 41 and of the connecting and annular conduits 40. In the case of pressure polymerization of plastics, the intake fitting 5 can be closed off with respect to the outside.

The invention has been described above in terms of a reactor having shafts located in a ring and driven in the same direction. However, it is not limited to apparatuses of this kind, but can instead be used in principle for other apparatuses for processing plastic material, such as screw mixers, screw kneaders, and aerating and degassing equipment—in short, whenever shafts must be extended in a sealed manner to the outside from a chamber in which a very viscous medium that is at negative pressure is being processed.

I claim:

1. A shaft seal assembly, in particular for an apparatus for continuous processing of very viscous media, in particular for producing high molecular weight polymers, for example the condensation of polyester, having parallel shafts having at least two cooperating processing tools, with which shafts feed and removal devices for the product to be processed and one reaction chamber that can be subjected to a vacuum are associated, which chamber is defined on at least one side by a portion of a housing that has ducting devices for the shafts that can be coupled with a distributor gear driving them and disposed on the outside, wherein the reaction chamber, via sealing means containing at least one slide ring seal, is sealed off in the vicinity of the shaft ducting devices from a confining-liquid chamber located on the outside and surrounding the shaft ends, which chamber contains a confining liquid, characterized in that on the side oriented toward the reaction chamber (4), adjoining the sealing means (46, 55), each shaft (1) is surrounded by a cushion of inert gas, which has a higher pressure than the confining liquid and is defined, in a manner sealed off from the reaction chamber (4), by means of housing parts (81) surrounding the shafts (1) over a portion of their length as well as by the product to be processed, which surrounds the shafts (1) and is under pressure.

2. A shaft seal assembly according to claim 1, characterized in that the inert gas cushion is disposed respectively adjoining one slide ring seal (46) of the sealing means.

3. A shaft seal assembly according to claim 2, characterized in that the inert gas cushion is effective on a fluid level, located above the slide ring seal surfaces (819) of the slide ring seal (46, 55), of a lubricant fluid supplying the slide ring seal.

4. A shaft seal assembly according to claim 3, characterized in that it has a circulation loop, containing a fluid pumping means (516), for the lubricant fluid, which loop communicates with the inert gas cushion and optionally with a source of inert gas and is extended via a device (521) for adjusting the lubricant fluid level with respect to the slide ring seal surfaces (516).

5. A shaft seal assembly according to claim 4, characterized in that the circulation loop is connected to devices (90; 502) for monitoring the occurrence of a loss of lubricant fluid and for replacing missing lubricant fluid.

6. A shaft seal assembly according to claim 2, characterized in that the inert gas cushion adjoining the sealing means (46, 55) is formed in a chamber (86) surrounding each of the shafts (1), which chamber communicates with a source of inert gas and is defined on one side by an annular gap.

7. A shaft seal assembly according to claim 1 characterized in that the shafts (1), preferably in the vicinity of their outlet from the housing parts (81, 800) surrounding them and communicating with the feed devices (91, 92) for the product to be processed, have throttling or reversing elements (100, 93), which act counter to the product to be processed and that is supplied to them in the longitudinal direction of the shafts, and by means of which the product to be processed can be subjected, in the vicinity adjoining the inert gas cushion, to a predetermined backpressure.

8. A shaft seal assembly according to claim 7, characterized in that the reversing elements (93) are formed as feed screws at least partly surrounded by the housing parts (81), the courses of the screws being located contrary to the courses of coaxial feed screws (93) located preceding them in the housing parts (81), and that the feed pressure generated by the feed screws (83) is greater than the backpressure generated by the reversing elements (93).

9. A shaft seal assembly according to claim 7, characterized in that with shafts (1) located in the manner of a ring and with their processing elements (3) intermeshing with one another, the shafts (1), in the vicinity of their outlet from the housing parts (81) surrounding them, have preferably circular-round disks (100) meshing with one another, forming defined gaps, the disks being located in stacked fashion and acting as throttling elements.

10. A shaft seal assembly according to claim 9, characterized in that the disks (100) of each stack are surrounded, on their inside oriented toward the reaction chamber (4), by housing parts over only a portion of the axial length of the stack.

11. A shaft seal assembly according to claim 10, characterized in that the disks (100) are surrounded on their outside, with play, by housing parts (9) over the entire axial length of the stack.

12. A shaft seal assembly according to claim 10, characterized in that the disks (100) are surrounded on their outside, over a portion of their axial stack length by housing parts spaced radially apart from them by a greater distance than on the inside.

13. A shaft seal assembly according to claim 9, characterized in that the housing parts (81) surrounding throttling or reversing elements (100; 93) are axially adjustable relative to the throttling or reversing elements, thereby varying the backpressure generated.

14. A shaft seal assembly according to one of the foregoing claims, characterized in that the sealing means have two slide ring seals (46, 55) located one after the other in the axial direction, each of which having associated with it a confining-liquid chamber (11, 20) containing confining liquid.

15. A shaft seal assembly according to claim 1, characterized in that each confining-liquid chamber (11, 20) includes a confining liquid feed device (413) discharging into its lower portion and a confining liquid removal device (60; 411) leading away from its upper portion, and that the confining liquid feed and removal devices are located in a confining liquid circulation loop containing a regulated cooling device (401), by means of which loop the confining liquid can be recirculated.

16. A shaft seal assembly according to claim 14, characterized in that one radial bearing (56) for each shaft end (10) is located between the two slide ring seals (55).

17. A shaft seal assembly according to claim 15, characterized in that at least a portion of the sealing elements of the slide rings seals (46, 55) is bathed at least partially by a fluid and is optionally lubricated with it in the vicinity of the slide ring seal surfaces.

18. A shaft seal assembly according claim 1, characterized in that at least one slide ring seal (46, 55) is formed as a double seal having two sealing elements (45, 45a) integral with the housing and spaced axially apart from one another and two sealing rings (47; 47a) resiliently pressed against them in the axial direction, the two sealing rings (47, 47a) of which are braced axially resiliently against one another.

19. A shaft seal assembly according to claim 18, characterized in that the two sealing rings (47, 47a) are each axially braced via two thrust bushings (50, 50a), which are connected to one another by means of flanges (52, 52a) and axially accessible clamping screws (53), and that the flanges (52, 52a) of adjacent shafts (1) are formed and located such that they roll off with play on one another.

20. A shaft seal assembly according to claim 1, characterized in that the shaft ends (10) on the drive side are surrounded by lubricant fluid, the fluid levels of which are located above the slide ring seal surfaces of a slide ring seal (55).

21. A shaft seal assembly according to claim 1, characterized in that discharging in the vicinity adjoining the inert gas cushion, following the feed device (91) for the product to be processed, is a feed device (901) for additives, which has a gas-tight supply container (902) containing the additives, the interior of which container is subjected to the pressure of the inert gas cushion and communicates with this cushion.

22. A shaft seal assembly according to claim 1, characterized in that the shafts (1) are removable, together with the sealing means (46, 55) of the shaft ducting devices, from a housing (6) surrounding them.

* * * * *